United States Patent
Higuchi et al.

(10) Patent No.: US 6,959,228 B2
(45) Date of Patent: Oct. 25, 2005

(54) METHOD OF PROTECTING DATA STORED IN A MEMORY OF WELDING CONTROLLER

(75) Inventors: Daisuke Higuchi, Ayase (JP); Yasuhiro Obara, Ayase (JP); Akihiro Kaburagi, Ayase (JP)

(73) Assignee: Obara Corporation, Ayase (JP)

( * ) Notice: Subject to any disclaimer, the term of this patent is extended or adjusted under 35 U.S.C. 154(b) by 252 days.

(21) Appl. No.: 10/134,267

(22) Filed: Apr. 29, 2002

(65) Prior Publication Data

US 2002/0165621 A1 Nov. 7, 2002

(30) Foreign Application Priority Data

May 1, 2001 (JP) ........................................ 2001-133814

(51) Int. Cl.[7] .............................................. G06F 19/00
(52) U.S. Cl. ........................ 700/212; 700/12; 700/207; 219/130.21
(58) Field of Search ............................ 700/12, 83, 207, 700/212; 219/130.21; 711/103

(56) References Cited

U.S. PATENT DOCUMENTS

| 4,493,040 | A | * | 1/1985 | Vanderhelst ................ 700/212 |
| 5,812,408 | A | * | 9/1998 | Karakama et al. ........... 700/212 |
| 6,072,146 | A | | 6/2000 | Matuschek et al. |
| 6,518,545 | B1 | * | 2/2003 | Richard et al. ......... 219/130.21 |

FOREIGN PATENT DOCUMENTS

| EP | 0 576 305 | 12/1993 |
| EP | 1 085 521 | 3/2001 |
| WO | WO 01/12374 | 2/2001 |

OTHER PUBLICATIONS

ST24C04, ST25C04, ST24W04, ST25W04, 4kBit Serial I²C Bus EEPROM with User–Defined Block Write Protection, Feb. 1999 (Feb. 1999), STMicroelectronics XP002206612.
European Examination Report dated Apr. 8, 2004.

* cited by examiner

*Primary Examiner*—Albert W. Paladini
*Assistant Examiner*—Carlos R. Ortiz-Rodriguez
(74) *Attorney, Agent, or Firm*—Flynn, Thiel, Boutell & Tanis, P.C.

(57) ABSTRACT

A method of protecting data stored in a memory of a welding controller provided with an EEPROM as a storage element capable of storing welding control data in a welding controller, thereby enhancing reliable protection of data stored in the EEPROM. The method of protecting data stored in a memory of a welding controller comprises the steps of providing the EEPROM having write validity control function means in the controller, using the EEPROM as a storage element for storing welding control data therein, writing the welding control data into the EEPROM and storing the same in the EEPROM, reading the welding control data from the EEPROM when the welding controller is used, and rendering the EEPROM transitive from a write disable state to a write enable state by the write validity control function when the welding control data is changed.

6 Claims, 2 Drawing Sheets

METHOD OF PROTECTING DATA STORED IN A MEMORY OF WELDING CONTROLLER

FIELD OF THE INVENTION

The invention relates to a method of protecting data stored in a memory of a welding controller for controlling welding operation in accordance with welding condition data as stored in a memory.

BACKGROUND OF THE INVENTION

A welding controller for controlling welding operation in accordance with welding condition data as stored in a memory as shown in FIG. 3 has been conventionally commonly known.

That is, in FIG. 3, a CPU 21 controls a welding machine in accordance with a system program stored in a ROM 22. A fixed program, fixed data and the like for controlling welding operation (hereinafter referred to as welding control fixed program and fixed data) are stored in the ROM 22, and operation instruction and the like are stored in a RAM 23. The CPU 21 controls welding operation upon reading the welding control fixed program, fixed data, operation instruction and the like from the ROM 22 and the RAM 23.

Data such as change of welding condition and the like during welding operation is written into the RAM 23, and the welding operation is carried out under the changed condition. Upon completion of the welding operation, welding control data is stored in the RAM 23 and it is read from the RAM 23 at the start of the next welding operation.

The RAM 23 is connected to a control power supply 24 and also connected to a battery 26 via the control power supply 24 and a changeover switch 25, wherein the welding control data stored in the RAM 23 is held by a power supply from the battery 26 when the control power supply 24 is turned off, thereby protecting the welding control data. The changeover switch 25 for turning off the control power supply 24 is operated upon reception of a signal from a voltage detection circuit 27 for detecting a value of the power supply inside the welding controller at the time when the power supply inside the welding controller is lower than a prescribed value.

However, the conventional well known welding controller has the following drawbacks. That is, firstly, if information stored in the RAM is held by an auxiliary power supply such as the battery 26 and the like, information to be stored cannot be held in the RAM when a cell of the auxiliary power supply is consumed or it is deteriorated with lapse of time, i.e., subjected to aged deterioration, thereby braking data. Secondly, even if the cell of the auxiliary power supply is neither consumed nor subjected to aged deterioration when thereof occurs a loose connection at the junction between the battery inclination face 26 and the changeover switch 25, information can not be held in the RAM, thereby braking data. Thirdly, if the CPU 21 is erroneously operated for some reason, the CPU 21 effects unexpected operation so that abnormal data is written into the RAM 23, thereby braking data. Fourthly, since the battery 26 or a capacitor having high capacitance is used, a period for holding data becomes finite.

SUMMARY OF THE INVENTION

The invention has been developed to solve the drawbacks of the prior arts, and it is an object of the invention to provide a method of protecting data stored in a memory of a welding controller by providing an EEPROM (electrically erasable programmable ROM) to a welding controller as a storage element for storing welding control data therein, thereby enhancing reliable protection of data stored in the ROM.

To achieve the above object, the method of protecting data stored in a memory of a welding controller for controlling a welding operation in accordance with welding condition data stored in the memory is characterized in comprising the steps of providing an EEPROM provided with write validity control function means in a controller, using the EEPROM as a storage element for storing welding control data therein, writing the welding control data into the EEPROM and storing the same in the EEPROM, reading the welding control data from the EEPROM when the welding controller is used, and rendering the EEPROM transitive from a write disable state to a write enable state by the write validity control function when the welding control data is changed.

PREFERRED EMBODIMENT OF THE INVENTION

Figure 1:
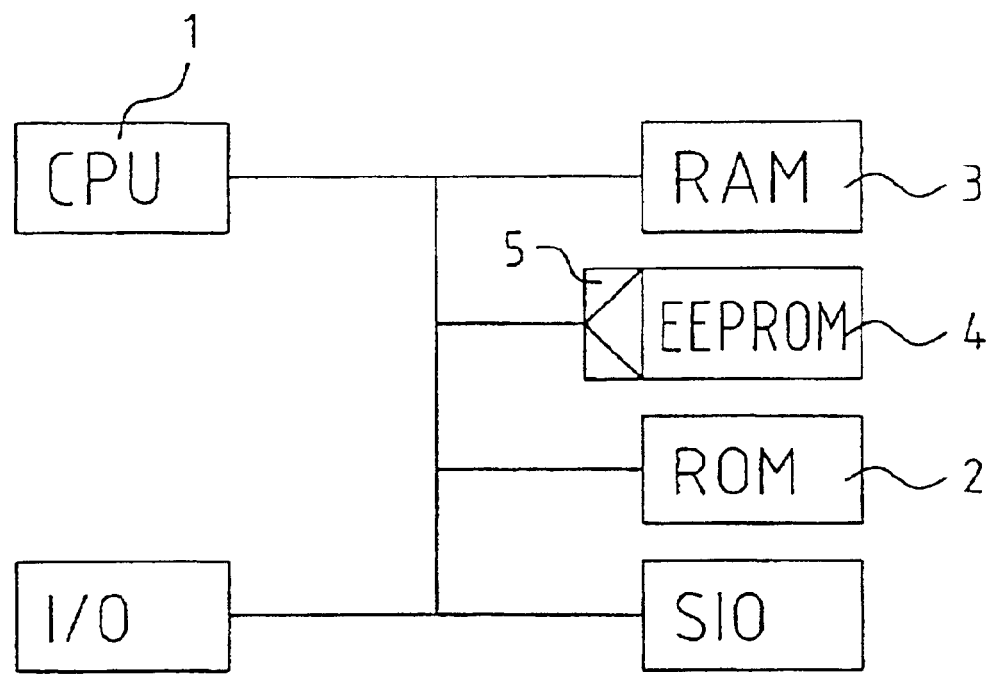
FIG. 1 is a schematic block diagram of a welding controller which is suitable for working a method of protecting data stored in a memory of a welding controller according to a preferred embodiment of the invention.

A method of protecting data stored in a memory of a welding controller according to a preferred embodiment of the invention is now described with reference to FIGS. 1 and 2. FIG. 1 is a schematic block diagram of a welding controller which is suitable for working the method of protecting data stored in a memory of a welding controller according to a preferred embodiment of the invention, and FIG. 2 is a view showing a transition state of an EEPROM.

In FIG. 1, depicted by 1 is a CPU disposed inside a welding controller, and the CPU 1 controls a welding machine in accordance with a system program stored in a ROM 2. A welding control fixed program and fixed data and the like are stored in the ROM 2, and an operation instruction and the like are stored in a RAM 3, and welding control data is stored in an EEPROM 4 serving as an electrically rewritable ROM. The CPU 1 reads programs and the like from the ROM 2, the RAM 3 and the EEPROM 4 and writes welding control data into the RAM3.

Write validity control function 5 is applied to the EEPROM 4, and the welding control data stored in the EEPROM 4 is read out during welding operation and is supplied to the CPU 1. However, information from the CPU 1 is protected so that it is not supplied to the EEPROM 4.

Figure 2:
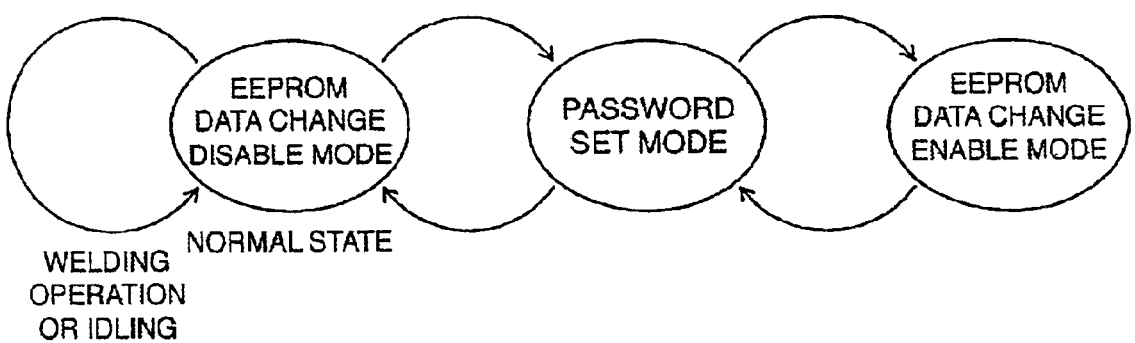
FIG. 2 is a view showing a transition state of an EEPROM.
Figure 3:
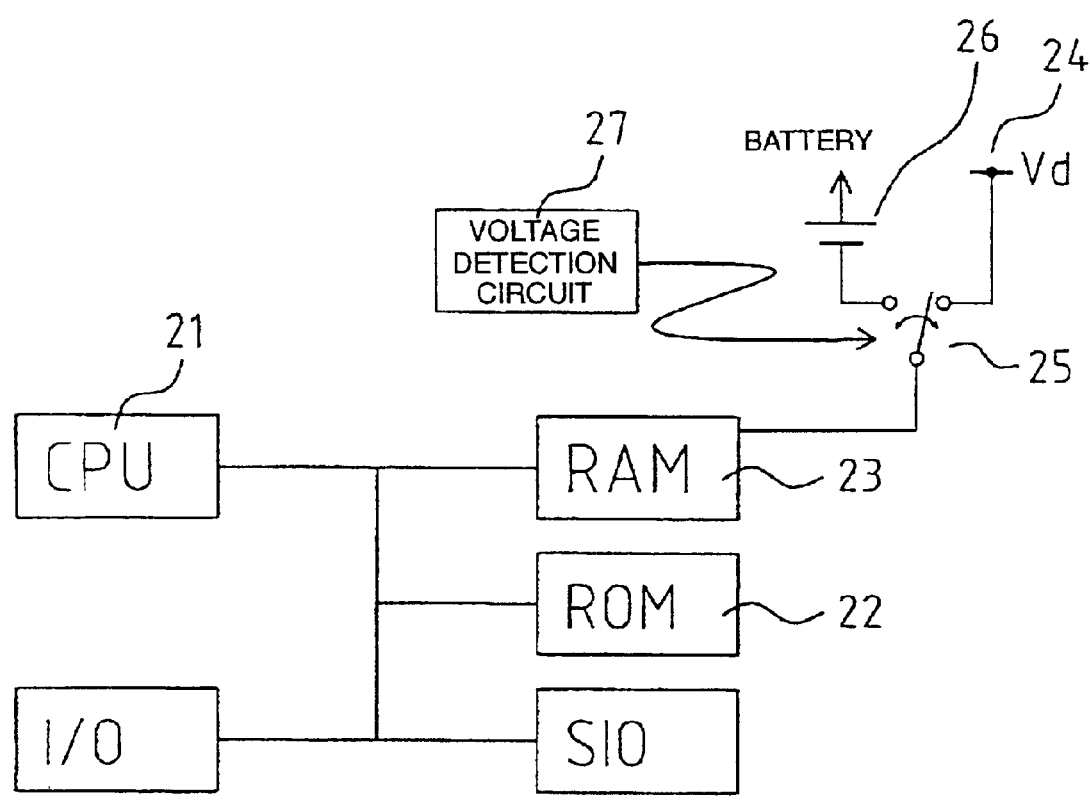
FIG. 3 is a schematic block diagram of a conventional welding apparatus.

That is, as shown in FIG. 2 showing a transition state, welding control data stored in the EEPROM 4 is in a change disable mode by the write validity control function 5 in a normal state representing welding use state, and the EEPROM 4 is influenced by information from the CPU 1.

If welding control data stored in the EEPROM 4 is updated depending on a welding condition and the like, the EEPROM 4 is rendered first in a writable transition state by the validity control function 5, for example by a write validity protector such as a password.

Subsequently, necessary welding control data (update data) is written and stored in the EEPROM 4 in the rewritable transition state, then the EEPROM 4 is rendered in a rewritable inhibit transition state upon completion of updating data.

Accordingly, the updated welding control data which is stored in the EEPROM 4 is in a change disable mode by the write validity control function 5 in a normal state representing a welding use state.

As mentioned above, since the welding control data stored in the EEPROM 4 is not cleared, it is not necessary to provide an auxiliary power supply such as a battery, a capacitance having a high capacitance or the like which was applied to a case where the RAM has been conventionally used as a memory element for storing welding control data therein. Further, there is no likelihood of breakage of data caused by the loose connection at the junction between the battery inclination face and the changeover switch, and a period for holding data becomes infinite. Further, even if the CPU 1 is erroneously operated for some reason, data in the EEPROM 4 is not updated unless it is rendered transitive state by the write validity control function 5 such as a password.

Although the EEPROM is exemplified as the electrically rewritable ROM in the preferred embodiment, it is a matter of course that that a flash memory is included in the EEPROM. Further, although the password is exemplified as a write protector, an ON/OFF type external valid signal or a mechanical key structure may be used instead of the password.

Since the method of protecting data stored in a memory of a welding controller for controlling a welding operation in accordance with welding condition data stored in the memory according to the invention is characterized in comprising the steps of providing an EEPROM provided with write validity control function means in a controller, using the EEPROM as a storage element for storing welding control data therein, writing the welding control data into the EEPROM and storing the same in the EEPROM, reading the welding control data from the EEPROM when the welding controller is used, and rendering the EEPROM transitive from a write disable state to a write enable state by the write validity control function when the welding control data is changed, if the welding control data stored in the EEPROM without needing an auxiliary power supply such as a battery, a capacitor having a high capacitance and the like is not cleared unless it is updated, and there is no likelihood of breakage of data, and further a period for holding data becomes infinite. Further, even if the CPU is erroneously operated for some reason, data stored in the EEPROM is not updated unless it is rendered transitive from a write disable state to a write enable state by the write validity control function, enhancing reliable protection of data.

What is claimed is:

1. A method of protecting welding control data stored in an EEPROM of a welding controller for controlling a welding operation comprising the steps of:

providing an EEPROM;

setting a password for the EEPROM wherein the EEPROM includes a password set mode;

using the EEPROM as a storage element for storing welding control data therein;

writing the welding control data into the EEPROM and storing the same in the EEPROM;

reading the welding control data from the EEPROM during operating of the welding controller;

rendering the EEPROM transitive from a write disable state to a write enable state by entering a password to permit changing of the welding control data when a write validity control function occurs; and preventing the EEPROM from being in the write enable state when the welding controller is controlling a welding operation.

2. A method of protecting welding control data stored in an EEPROM of a welding controller for controlling a welding operation comprising the steps of:

providing a welding control fixed program with fixed data stored in a ROM;

providing a RAM with operation instructions;

providing an EEPROM with welding control data, the EEPROM serving as an electrically rewritable RAM having a data change disable mode and a data change enable mode;

providing a CPU for reading the welding control fixed program from the ROM, the operation instructions from the RAM, and the welding control data from the EEPROM, the CPU writing welding control information into the RAM for controlling a welding machine;

maintaining the EEPROM in the data change disable mode when the welding machine is operating, the data change disable mode preventing entry of data into the EEPROM;

manually actuating a write validity protector to enable writing of new welding control data into the EEPROM;

writing the new welding control data in the EEPROM; and returning the EEPROM to the data change disable mode to enable operation of the welding machine, wherein even if the CPU is operated erroneously, the write validity protector prevents abnormal data from replacing the welding control data stored in the EEPROM.

3. The method of protecting welding control data stored in an EEPROM of a welding controller of claim 2, wherein the EEPROM includes a password set mode, the method comprising the step of:

setting a password for the EEPROM, and wherein the step of manually actuating a write validity protector to enable the writing of new welding control data into the EEPROM comprises entering a password.

4. The method of protecting welding control data stored in an EEPROM of a welding controller of claim 2, wherein the step of manually actuating a write validity protector to enable the writing of new welding control data into the EEPROM comprises operating an external ON/OFF mechanism.

5. The method of protecting welding control data stored in an EEPROM of a welding controller of claim 2, wherein the step of manually actuating a write validity protector to enable the writing of new welding control data into the EEPROM comprises operating a mechanical key structure.

6. The method of protecting welding control data stored in an EEPROM of a welding controller of claim 2, wherein the welding controller is free from an auxiliary power supply.

* * * * *